G. VALENTINE.
APPARATUS FOR FILLING MILK CANS.
APPLICATION FILED JAN. 15, 1914.

1,183,916.

Patented May 23, 1916.

Witnesses:
Inventor:
Gordon Valentine
By David H. Fletcher
Atty.

UNITED STATES PATENT OFFICE.

GORDON VALENTINE, OF CHICAGO, ILLINOIS.

APPARATUS FOR FILLING MILK-CANS.

1,183,916.  Specification of Letters Patent.  Patented May 23, 1916.

Application filed January 15, 1914. Serial No. 812,275.

*To all whom it may concern:*

Be it known that I, GORDON VALENTINE, a citizen of the United States, residing at Chicago, in the county of Cook and State of Illinois, have invented certain new and useful Improvements in Apparatus for Filling Milk-Cans, of which the following is a description, reference being had to the accompanying drawings, forming a part of this specification, in which corresponding letters of reference in the different figures indicate like parts.

As a result of the practical difficulties involved in properly filling milk-cans in addition to the fact that a considerable quantity of foam is produced during the process as heretofore conducted, it has been found wholly impracticable to handle and transport milk in this form of receptacle and at the same time insure sanitary conditions. Owing to the strong tendency of the milk to foam when poured into the can in the usual way, the attendant is prevented from seeing when it is filled to the proper height and hence the results become largely a matter of chance. If the can is too full, the milk is forced upwardly around the closure where it becomes sour and, upon opening the can, it falls back to contaminate the remaining contents. If not full enough, it is caused to "churn" during transportation and hence deteriorates in value.

The primary object of my invention is to provide cheap and simple means whereby imperfect filling may be avoided, and that without requiring the constant and close attention of an attendant as has heretofore been necessary.

A further object is to provide satisfactory means in conjunction with filling appliances, for preventing the formation of froth, thereby insuring greater accuracy in filling, while providing for the escape of animal gases which would otherwise be retained in the foam to the detriment of the milk.

I accomplish said objects in the manner and by the means hereinafter more particularly described, the novel features of which are definitely set forth in the claims.

Figure 1:
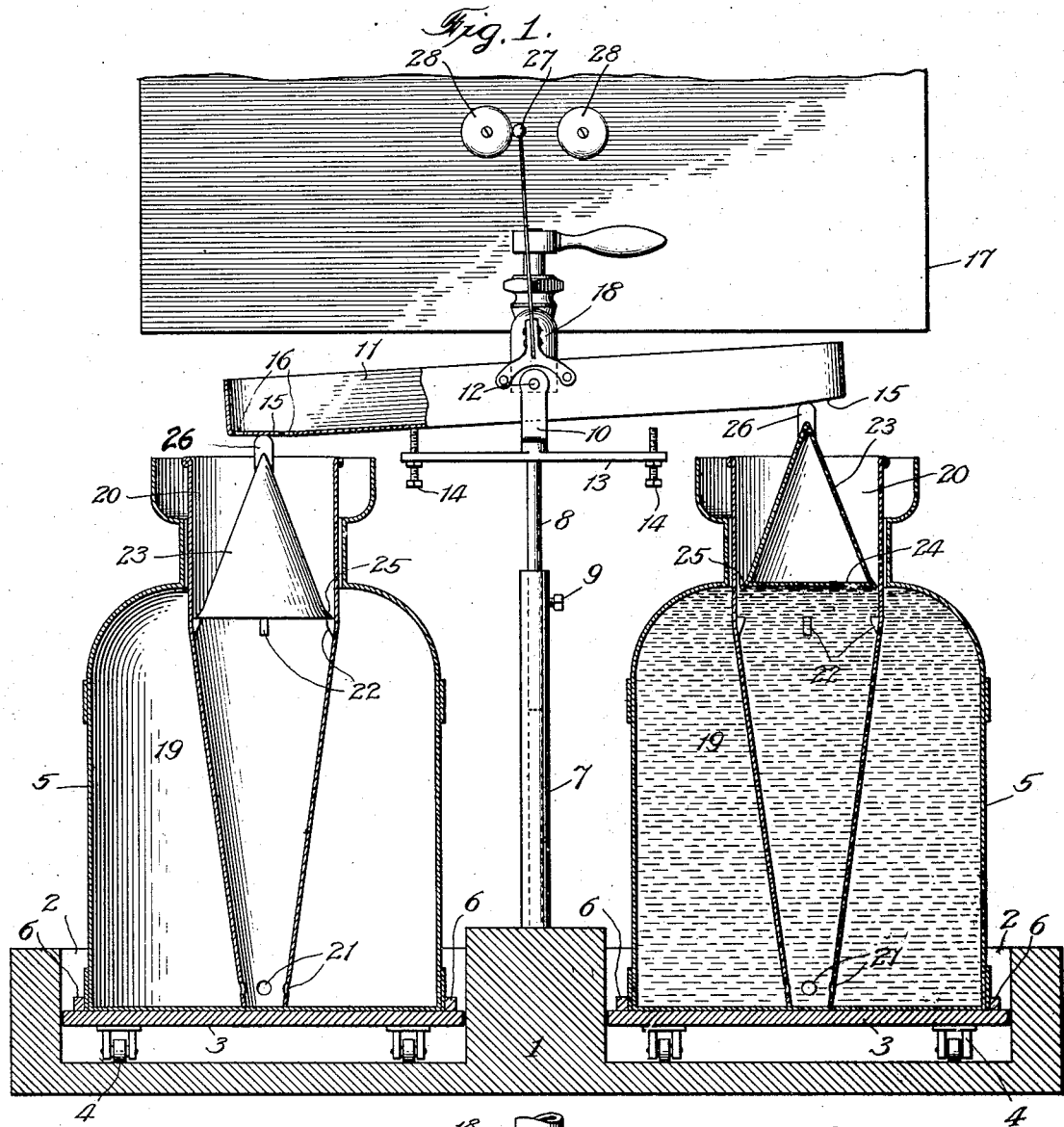
Figure 2:
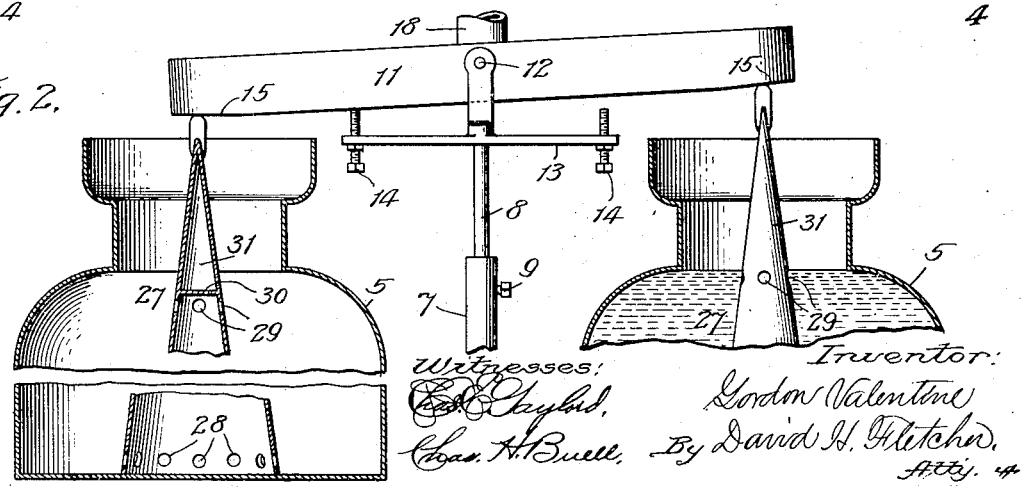

In the drawings, Figure 1, is a view partly in elevation and partly in vertical section, showing a filling apparatus embodying the features of my invention, and Fig. 2, is a similar view showing a modified construction.

Referring to the drawings, 1, indicates the base of a frame which is preferably provided with recesses or spaces 2, for the reception of small platform trucks 3, mounted upon casters 4. Each truck is adapted to support a milk-can 5, and is, by preference, provided with means, such, for example, as the cleats 6, for centering and positioning the can. Midway between the recesses 2, is rigidly secured an upright standard 7, formed from hollow tubing, into which is inserted a sliding rod 8, adjustably held at any desired height by means of a set-screw 9. Formed upon the upper end of the rod 8, is a bifurcated member having upwardly extended arms 10, located upon opposite sides of, and adapted to serve as supports for, a tilting trough 11, which is provided with trunnions 12, at its middle, journaled in bearings in the parts 10. A horizontal bar 13, is rigidly attached to the part 8, beneath the trough, through the ends of which is projected adjusting screws 14, for adjusting and limiting the extent to which said trough may be tilted. A portion 15, of the bottom of the trough at each end is inclined at such an angle to the main body of said bottom as to assume a horizontal position when the trough is tilted as shown at the left in Fig. 1. A series of discharge openings 16, are formed in the trough bottom at each end thereof, said openings being preferably arranged in a circle for the purpose hereinafter stated.

A reservoir 17, provided with a discharge faucet 18, is located above the level of the trough with said faucet in the vertical plane of the trough axis, so that when the trough is tilted, the flow of the milk will be shifted in the direction of its downward incline.

The cans are so located when in position for filling, that the center of each can will substantially coincide with a point in the bottom of the trough between and concentric with the openings 16. The tilting of the trough is intended to be accomplished automatically by means of floats in the respective cans which are alternately filled, the filling of one can serving to lift the float and tilt the trough so as to direct the outflow to the empty one. In order to prevent the accumulation of foam, I provide a suitable conduit in each can, together with an initial spreading device to cause the liquid to be conveyed with a gentle flow and in a thin film to the bottom of the can. In the nature of the case, the float is best adapted to form the spreading member, and in Fig. 1, I have shown what I regard as the preferred form for both conduit and float. The conduit or conveyer, generally designated by 19, conforms in length substantially to the height of the can and is adapted to be placed loosely therein so that its lower end will rest upon the can bottom. The upper portion 20, of said conveyer is cylindrical in form and somewhat longer than the can neck, while the lower part is tapered downwardly substantially as shown. Openings 21, are formed at or near the lower extremity of the conveyer to permit the milk to be discharged into the can. The diameter of the part 20, should be somewhat less than that of the can neck, so as to enable it to be readily inserted within the latter, and there is formed upon the inner face of the same at a level slightly below the lower portion of the can neck, a plurality of shoulders or lugs 22, which are located at a common level. A hollow sheet-metal float and spreading member 23, preferably conical in form, is loosely supported at its base upon the lugs 22. The greatest diameter of said float is somewhat less than that of the cylindrical portion 20, of the conduit, so as to leave a slight annular space between them when the float is in place. The bottom 24, of the float is preferably located above the level of the rim 25, which rim is flared outwardly as shown in order to direct the film of milk against the wall of the conduit.

I prefer to attach a lug 26, to the top of each float, said lug consisting of a flat piece of metal rounded at the top and adapted not only to contact with the trough as hereinafter stated, but to provide means for lifting the float into and out of the conduit.

The operation of the apparatus is as follows: The cans having been placed in position as shown, with the conduits and floats therein, the faucet is opened and milk allowed to flow into the trough. Being discharged from the openings 16, it falls out at different points around the apex of the spreader 23, and being spread thereon, is delivered in a thin annular film against the inner surface of the conduit 19, upon which it gently descends in a like film to the bottom. When the milk rises into contact with the float, the latter is lifted thereby and in turn lifts the lower end of the trough until its position is reversed and the flow is directed to the empty can. The adjustment should be such as to cause the reversal when the liquid attains the proper level in the can. By means of the rod 8, the height of the trough may be adjusted to conform to the height of the cans, while the adjusting screws 14, serve to limit the inclination of the trough.

In Fig. 2, I have shown a modification in which the float and conduit are permanently connected. In this construction the spreading conduit consists of a hollow sheet-metal cone, generally designated by 27, of a height conforming substantially to that of the can. Said cone is open at its lower end, the diameter of which is slightly less than that of the can neck, and is provided with openings 28, at the lower end, for the admission of milk and openings 29, for the escape of air. Immediately above the latter openings is a partition 30, forming an air-tight chamber 31, in the upper part of the cone, which is thereby converted into a float, the operation of which is substantially the same as that of the preferred construction described.

The fact that the apparatus is automatic results in a saving of time, inasmuch as an attendant is free to give attention to other matters during the filling of the cans. In order that he may know when each successive can is full, I prefer to provide some means for attracting his attention at the proper time. This may consist of one or more bells or gongs with a suitable hammer to be actuated by the conveyer when shifted. In the example illustrated, I have shown a hammer 27, attached to the trough 11, so as to extend upwardly from its pivotal point, while bells 28, are attached to the reservoir 17. When the trough is shifted, the hammer is caused to strike one or the other bell, thereby warning the attendant to substitute an empty can for the full one.

One of the important sanitary advantages of my invention is that it enables cans to be accurately filled and closed at once, thereby avoiding the necessity for allowing them to stand open for a considerable time, subject to contamination, in order to "foam off," as has heretofore been found necessary.

Having thus described my invention, what I claim and desire to secure by Letters Patent is:

1. A device for automatically and alternately filling different receptacles from a source of continuous flow, comprising a pivoted conduit having discharge outlets upon opposite sides of its pivotal point, a floating spreader arranged to engage and lift the lowermost end of said conduit while the liquid stream is directed thereon and a removable conduit adapted to be placed in each receptacle for receiving the flow from said floats and conveying it downwardly in a thin film to prevent foaming.

2. A device for automatically and alternately filling different receptacles from a source of continuous flow, comprising, in combination, a pivoted conduit having discharge outlets upon opposite sides of its pivotal point, a spreader consisting of a float formed to receive and spread the liquid delivered thereupon from the downwardly tilted end of said conduit, while serving to tilt said conduit when the receptacle is full, and a removable conduit adapted to be placed in each receptacle for receiving the flow from the float, said conduit having inclined walls to cause the liquid to flow in a thin film thereon until it mingles with the fluid within the receptacle, whereby foaming may be avoided.

3. A device for automatically and alternately filling different receptacles from a source of continuous flow, comprising, in combination, a pivoted conduit having discharge outlets upon opposite sides of its pivotal point, floating spreaders, each arranged to lift the lowermost end of said conduit while the liquid stream is directed thereon, a removable conduit adapted to be placed in each receptacle for receiving the flow from the float arranged to coact therewith and convey it downwardly in a thin film to prevent foaming, and means for normally supporting said floating spreader within said removable conduit to permit the flow therefrom to be delivered in a thin film against the walls of said removable conduit.

In testimony whereof, I have signed this specificaton in the presence of two subscribing witnesses, this 12th day of January, 1914.

GORDON VALENTINE.

Witnesses:
DAVID H. FLETCHER,
JENNIE L. FISKE.